(12) United States Patent
Larkin et al.

(10) Patent No.: US 6,439,170 B1
(45) Date of Patent: Aug. 27, 2002

(54) SINGLE SEAM DUCT CORNER

(75) Inventors: James R. Larkin; Kevin J. O'Boyle; Michael Zakel, all of Wellsville, NY (US)

(73) Assignee: Alstom Power N.V., Amsterdam (NL)

( * ) Notice: Subject to any disclaimer, the term of this patent is extended or adjusted under 35 U.S.C. 154(b) by 0 days.

(21) Appl. No.: 09/735,224

(22) Filed: Dec. 12, 2000

(51) Int. Cl.$^7$ ................................................ F23C 15/02
(52) U.S. Cl. ............................ 122/1 A; 122/DIG. 2; 165/8; 165/10
(58) Field of Search .................... 122/1 A, DIG. 2; 165/8, 9, 10

(56) References Cited

U.S. PATENT DOCUMENTS 5,983,985 A * 11/1999 Counterman et al. .......... 165/8
6,091,061 A * 7/2000 Dreisler et al. ............ 219/494
6,145,582 A * 11/2000 Bolle et al. ................ 165/120

* cited by examiner

*Primary Examiner*—Jiping Lu
(74) *Attorney, Agent, or Firm*—Alix, Yale & Ristas, LLP

(57) ABSTRACT

A transition element for providing an interface between a duct having a substantially rectangular cross section and an air preheater having a substantially circular cross section. The transition element includes an inner sidewall, an outer sidewall, and first and second end walls, where the outer sidewall and the first and second end walls form first and second transition corners. Each of the transition corners comprises first and second flow deflectors, each having an outer terminal edge and first and second side edges extending laterally from the terminal edge to an inner point. The first side edge of the first flow deflector is mounted to the second side edge of the second flow deflector and the outer terminal edges of the first and second flow deflectors are mounted to the duct to connect the air preheater to the duct.

13 Claims, 7 Drawing Sheets

SINGLE SEAM DUCT CORNER

BACKGROUND OF THE INVENTION

The present invention relates to rotary regenerative air preheaters.

More particularly, the invention relates to the combustion air and flue gas inlets and outlets.

A rotary regenerative air preheater transfers sensible heat from the flue gas leaving a boiler to the entering combustion air through regenerative heat transfer surface in a rotor which turns continuously through the gas and air streams. The air preheater has a circular cross section to facilitate rotation of the rotor, which is packed with the heat transfer surface.

The air preheater is divided into a flue gas side or sector and one or more combustion air sides or sectors by sector plates. In a typical rotary regenerative heat exchanger, the hot flue gas and the combustion air enter the rotor shell from opposite ends and pass in opposite directions over the heat exchange material housed within the rotor. A duct system interconnecting the air preheater with the boiler includes a cool air duct for carrying cool combustion air to the air preheater, a hot air duct for carrying heated combustion air from the air preheater to the boiler, a hot flue gas duct for carrying hot flue gas from the boiler to the air preheater, and a cold flue gas duct for carrying cooled flue gas from the air preheater.

The duct work comprising the duct system generally has a rectangular cross section. Consequently, the combustion air inlet and outlet and the flue gas inlet and outlet includes apparatus to interface the rectangular ducts with the circular air preheater. The transition structure for such conventional inlets and outlets generally comprise multiple elements which are joined by numerous welds. Consequently, these transitions structures are time consuming and costly to construct. Further, conventional transition structures cannot be nested to reduce the overall volume for shipping, resulting in high shipping costs.

SUMMARY OF THE INVENTION

The present invention is a transition element for providing an interface between a duct having a substantially rectangular cross section and an air preheater having a substantially circular cross section. The transition element includes an inner sidewall, an outer sidewall, and first and second end walls, where the outer sidewall and the first and second end walls form first and second transition corners. Each of the transition corners comprises first and second flow deflectors, each having an outer terminal edge and first and second side edges extending laterally from the terminal edge to an inner point. The first side edge of the first flow deflector is mounted to the second side edge of the second flow deflector and the outer terminal edges of the first and second flow deflectors are mounted to the duct to connect the air preheater to the duct. Preferably, the first side edge of the first flow deflector is mounted to the second side edge of the second flow deflector by a weld seam.

Each flow deflector has a mid portion disposed intermediate the outer terminal edge and the inner point which is bowed toward the duct to provide the flow deflector with an arcuate shape. The arcuate shape of the flow deflectors and the weld seam connection between the flow deflectors provides a corner which is inherently stiffer than conventional corners.

The transition element also includes a duct mounting flange for mounting the transition element to the duct. The outer terminal edges of the first and second flow deflectors are mounted directly to the duct mounting flange by a second weld seam.

Depending on the application, the transition element may further include one or more stiffening elements mounted to the outside surface of one or more of the flow deflectors to provide additional mechanical strength.

An object of the invention is to provide a new and improved corner structure for the combustion air and flue gas inlets and outlets.

Another object of the invention is to provide a new and improved transition element for converting the rectangular structure of the duct work to the circular structure of the air preheater.

A further object of the invention is to provide a transition element which includes fewer components and is easier to manufacture and ship than conventional transition elements.

DESCRIPTION OF THE PREFERRED EMBODIMENT

Figure 1:
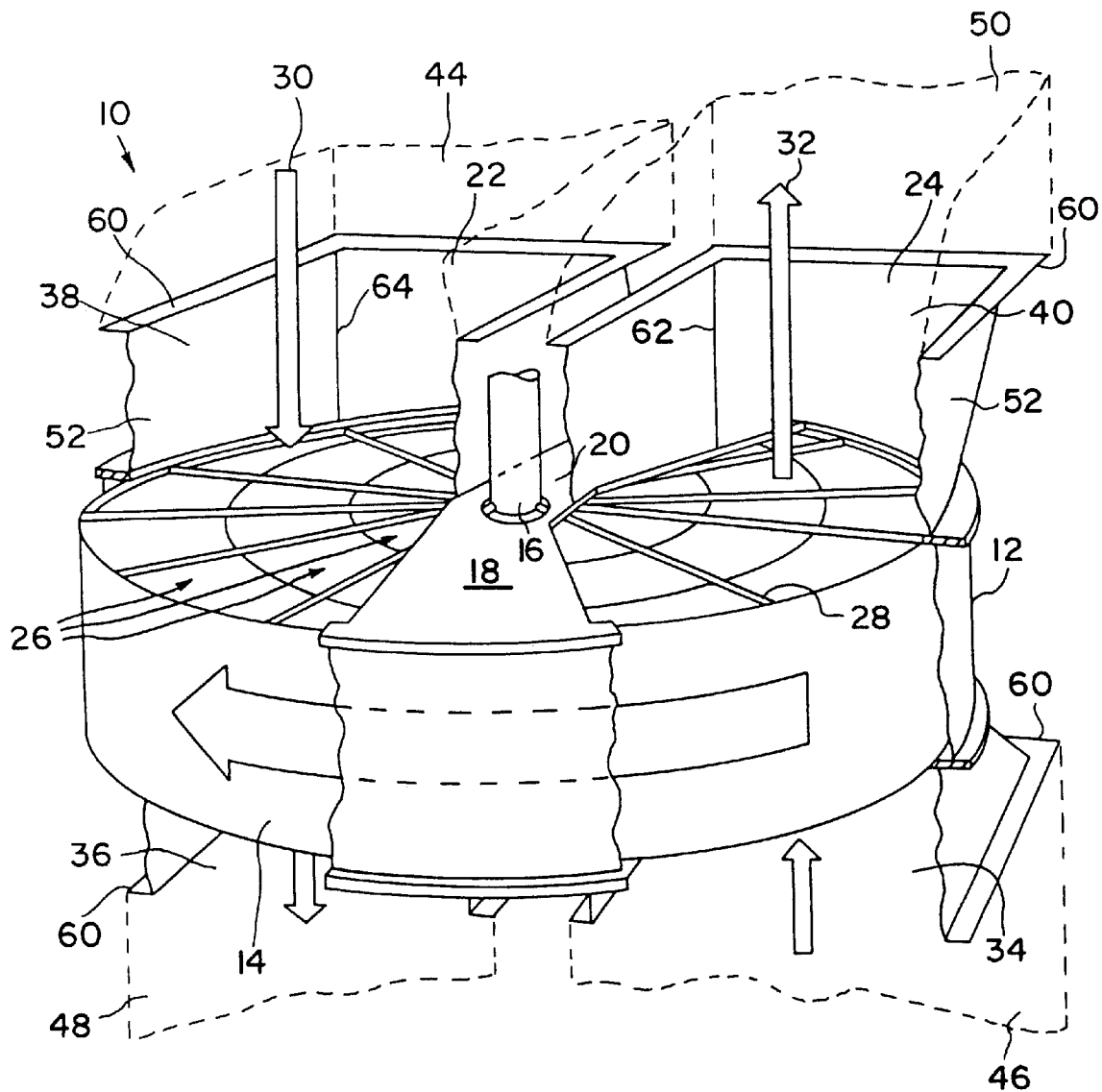
FIG. 1 is a general perspective view of a conventional rotary regenerative air preheater which is cut-away to show the upper sector plates.

FIG. 1 of the drawings is a partially cut-away perspective view of a typical bi-sector air preheater 10 showing a housing 12 in which the rotor 14 is mounted on a drive shaft or post 16. The housing is divided by means of the flow impervious sector plates 18 and 20 into a flue gas sector 22 and an air sector 24. Corresponding sector plates are also located on the bottom of the unit. Mounted on the inside of the housing 12 can be axial seal plates (not shown) which extend the full height of the rotor. The rotor 14 is divided into a plurality of pie-shaped compartments 26 by the diaphragm plates 28 with each pair of adjacent diaphragm plates 28 defining an acute angle.

For a VI type air preheater, the hot flue gases enter the air preheater 10 as indicated by the arrow 30, flow through the flue gas sector 22 where heat is transferred to the heat transfer surface in the rotor 14. As this hot heat transfer surface then rotates through the air sector 24, the heat is transferred to the air flowing through the rotor from the bottom as indicated by the arrow 32. Consequently, the cold air inlet 34 and the cooled gas outlet 36 define a cold bottom end and the hot gas inlet 38 and the heated air outlet 40 define a hot top end. In a V type air preheater, the bottom end is the hot end and the top end is the cold end. In a horizontal air preheater, the arrangement is rotated ninety degrees. The single seam duct corner 42 of the subject invention will be described in terms of the flue gas and air connections of the VI type air preheater. It should be appreciated that such single seam duct corner 42 is equally applicable to the flue gas and air connections of the V type and horizontal air preheaters.

The hot flue gas and cold air are delivered to the air preheater 10 via a hot gas duct 44 and a cold air duct 46 which are connected to the hot gas inlet 38 and cold air inlet 34, respectively. Similarly, the cooled flue gas and the heated air exit the air preheater 10 via a cooled gas duct 48 and a heated air duct 50 which are connected to the cooled gas outlet 36 and the heated air outlet 40, respectively. Conventional duct work, from which the hot gas duct 44, the cooled gas duct 48, the cold air duct 46, and the heated air duct 50 are constructed, has a rectangular cross section while the air preheater 10 has a substantially circular cross section. Consequently, the hot gas inlet 38, the cooled gas outlet 36, the cold air inlet 34, and the heated air outlet 40 each define a transition element 52 for converting the rectangular form of the duct work to the arcuate form of the air preheater 10.

Figure 2:
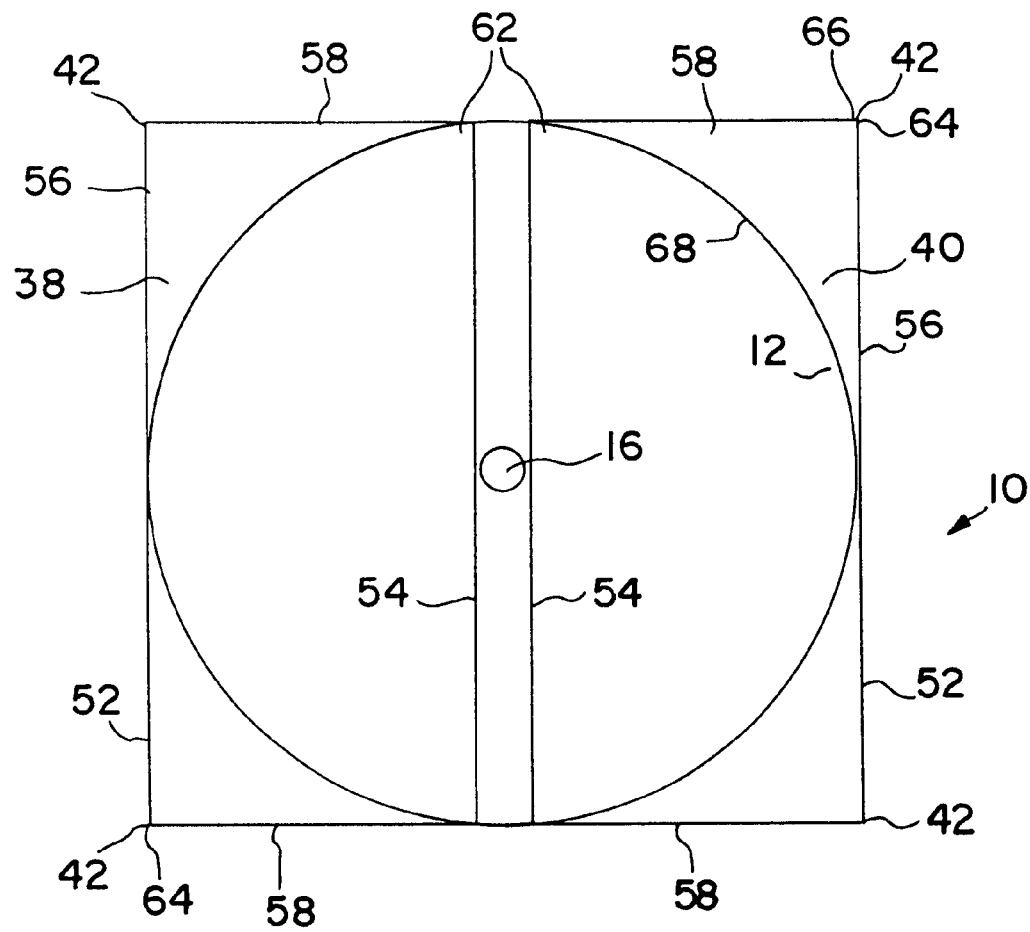
FIG. 2 is a simplified top plan view of the air preheater of FIG. 1.

As illustrated in FIGS. 1 and 2, the hot gas inlet 38, the cooled gas outlet 36, the cold air inlet 34, and the heated air outlet 40 have substantially similar shapes. Each inlet 34, 38 or outlet 36, 40 has longitudinally extending inner and outer sidewalls 54, 56, where the inner sidewalls 54 of the hot gas inlet 38 and the cooled gas outlet 36 are disposed on the opposite side of the rotor post 16 to the cold air inlet 34 and the heated air outlet 40, respectively. End walls 58 extend laterally between the inner and outer sidewalls 54, 56 to form a conduit for conducting the gas or air from the duct work to the rotor 14. Each inlet 34, 38 or outlet 36, 40 has a peripheral mounting flange 60 for connecting the inlet 34, 38 or outlet 36, 40 to the conventional duct. The inner corners 62 are right angles for the full height of the inlet 34, 38 or outlet 36, 40. Each outer corner 64 is a right angle at the axially outer end 66 and an axially inner end 68 which comprises one or more arc segments.

Figure 3:
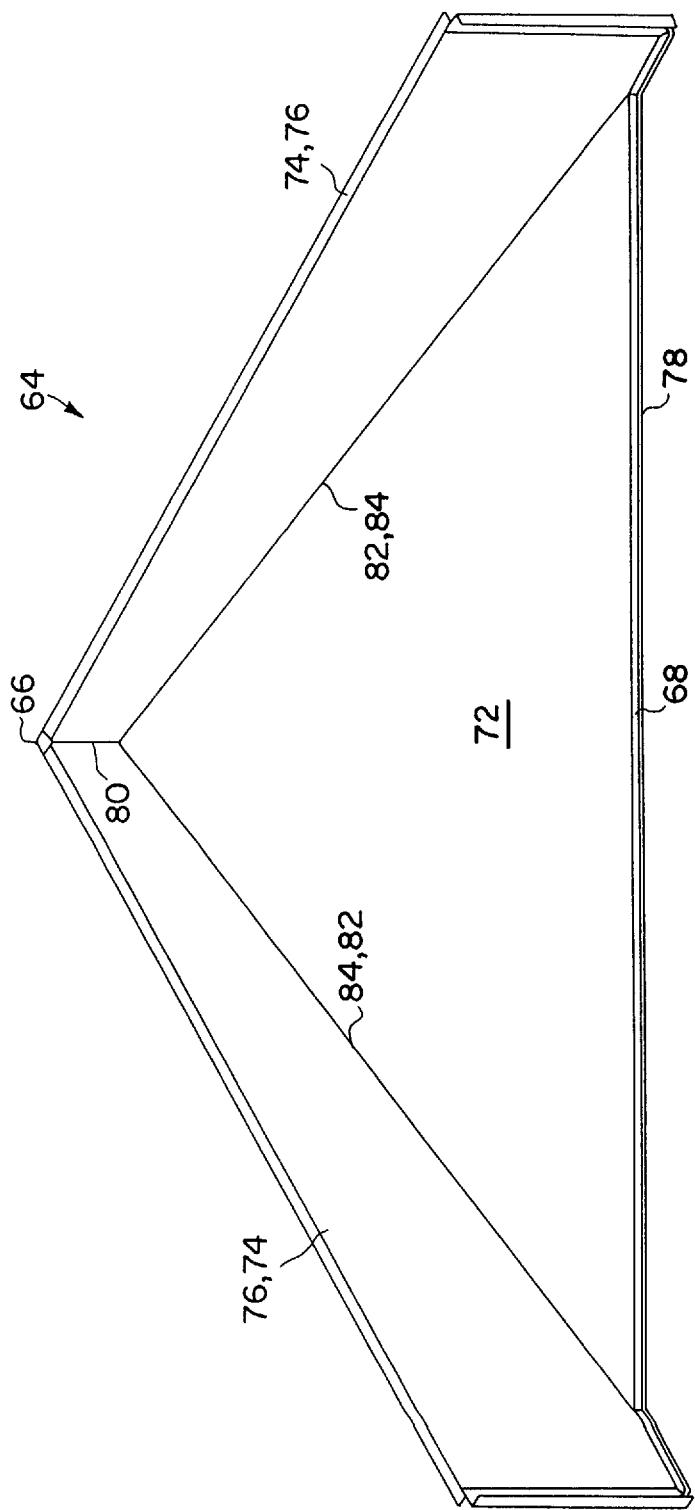
FIG. 3 is a front view of a prior art duct corner, as viewed from inside the duct.
Figure 4:
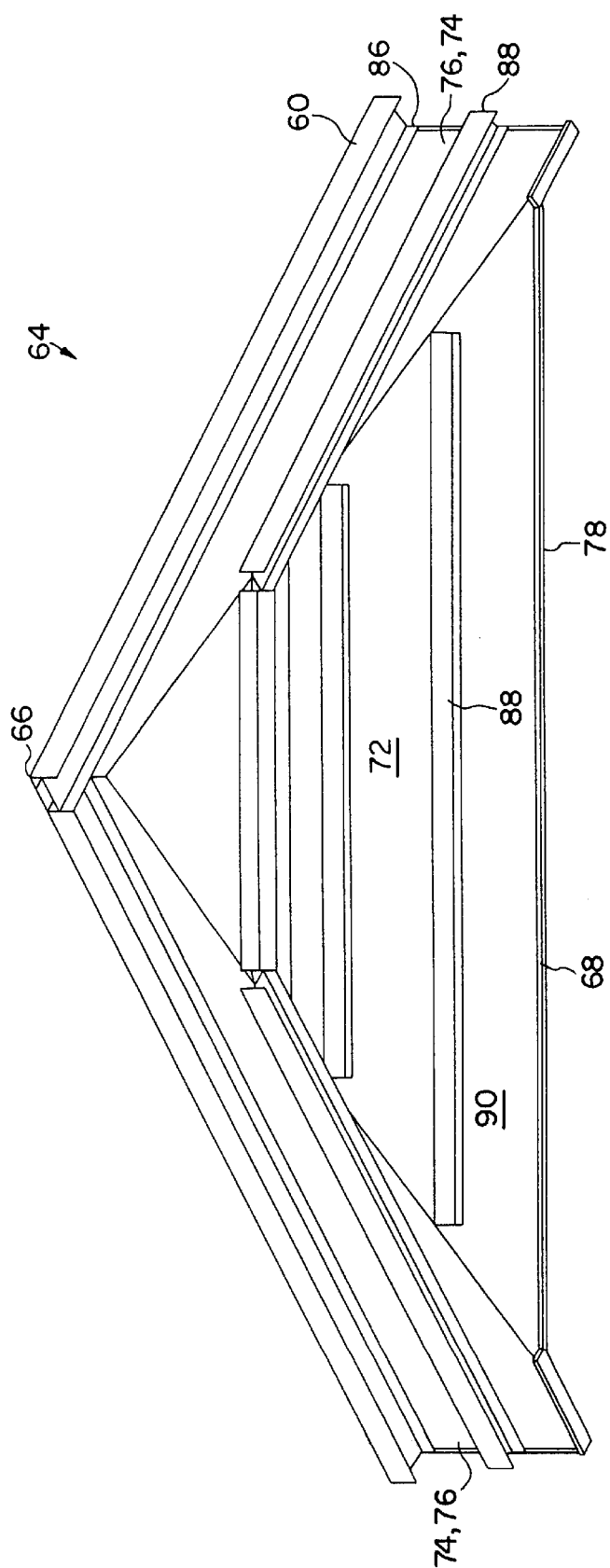
FIG. 4 is a back view of the prior art duct corner of FIG. 3.

With reference to FIGS. 3 and 4, the outer corners 64 of prior art hot gas inlets 38, cooled gas outlets 36, cold air inlets 34, and heated air outlets 40 are each multiple piece assemblies, with several weld seams required to mount the various components together. Generally, each such conventional corner includes a triangular-shaped flat flow deflector 72 which extends across the corner 64 between an outer sidewall segment 74 and a respective end wall segment 76. Conventionally, each flow deflector 72 defines a substantially planar surface extending to the inner end 68.

Such construction requires a first seam weld 80 to join the outer sidewall segment 74 to the end wall segment 76, a second seam weld 82 to join the flow deflector 72 to the outer sidewall segment 74, and a third seam weld 84 to join the flow deflector 72 to the end wall segment 76. A fourth seam weld 86 is also used to mount the duct mounting flange 60 to the periphery of the inlet 34, 38 or outlet 36, 40. Since the outer sidewall segment 74, the end wall segment 76, and the flow deflector 72 are all composed of relatively thin sheet metal, transitional duct stiffening elements 88 are generally required to provide the proper mechanical strength to these components. Generally, such stiffening elements 88 are welded to the outside surface 90 the outer sidewall segment 74, the end wall segment 76, and the flow deflector 72.

Figure 5:
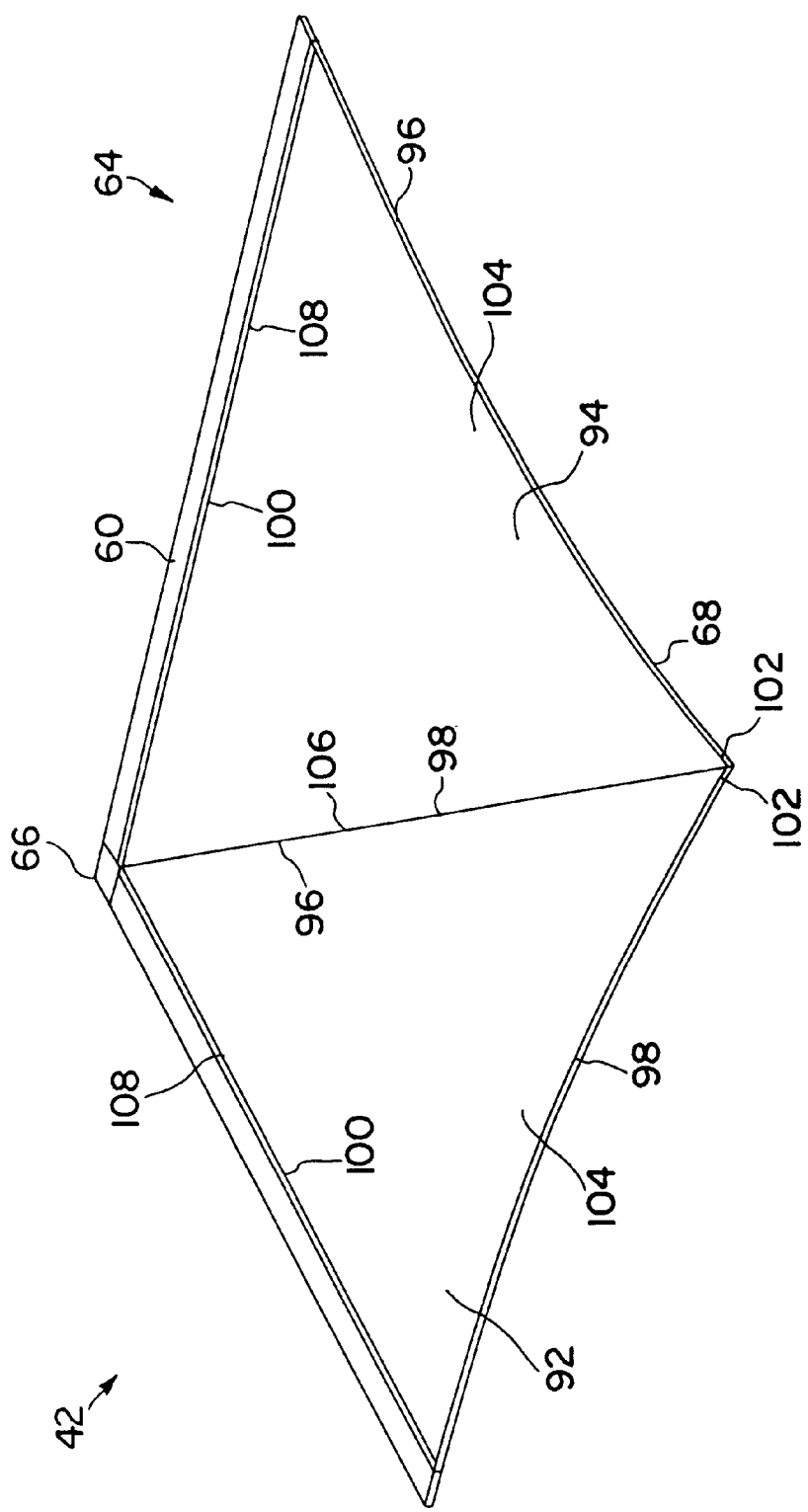
FIG. 5 is a front view of a duct corner in accordance with the present invention, as viewed from inside the duct.
Figure 6:
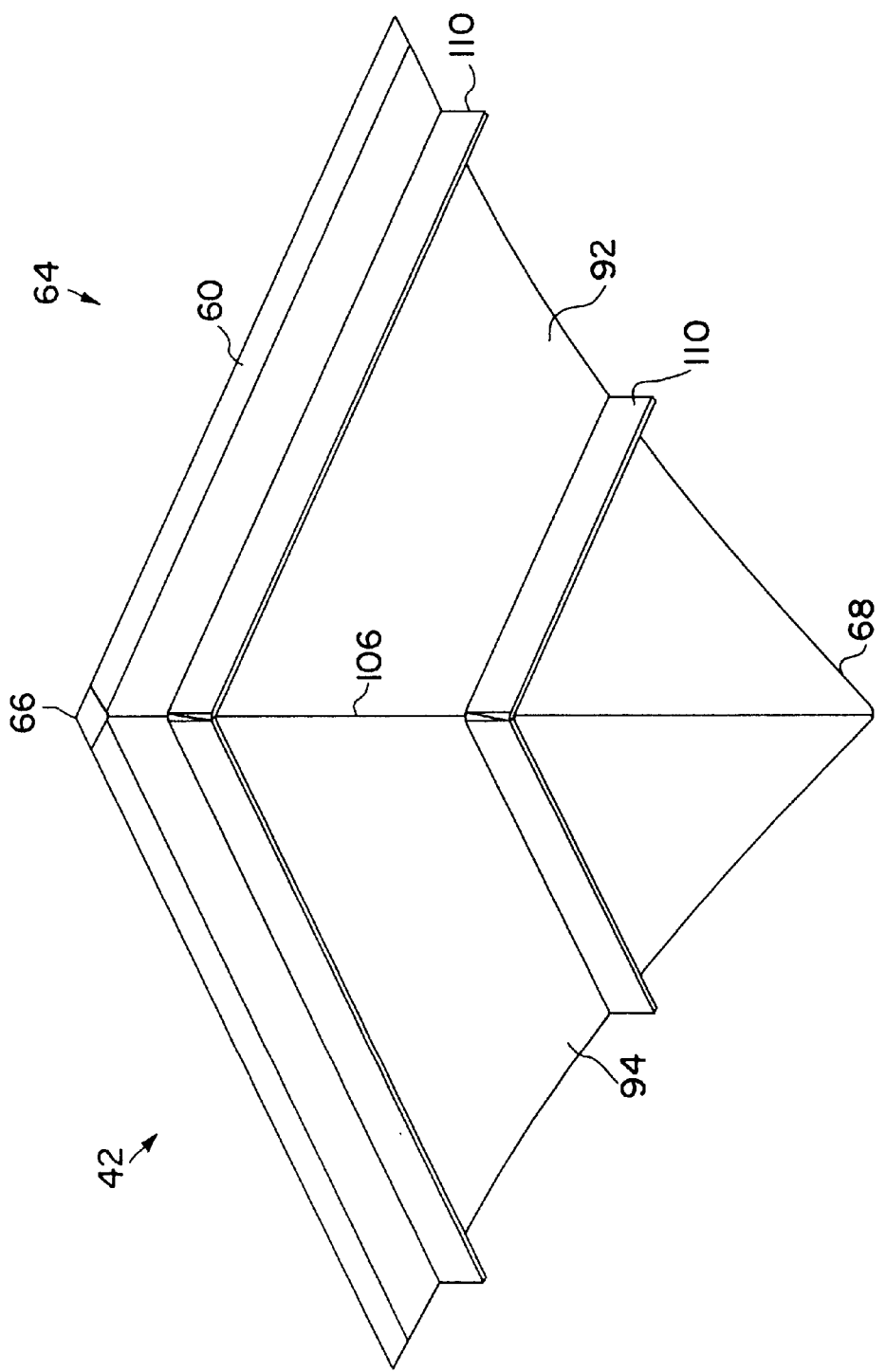
FIG. 6 is a back view of the duct corner of FIG. 5.
Figure 7:
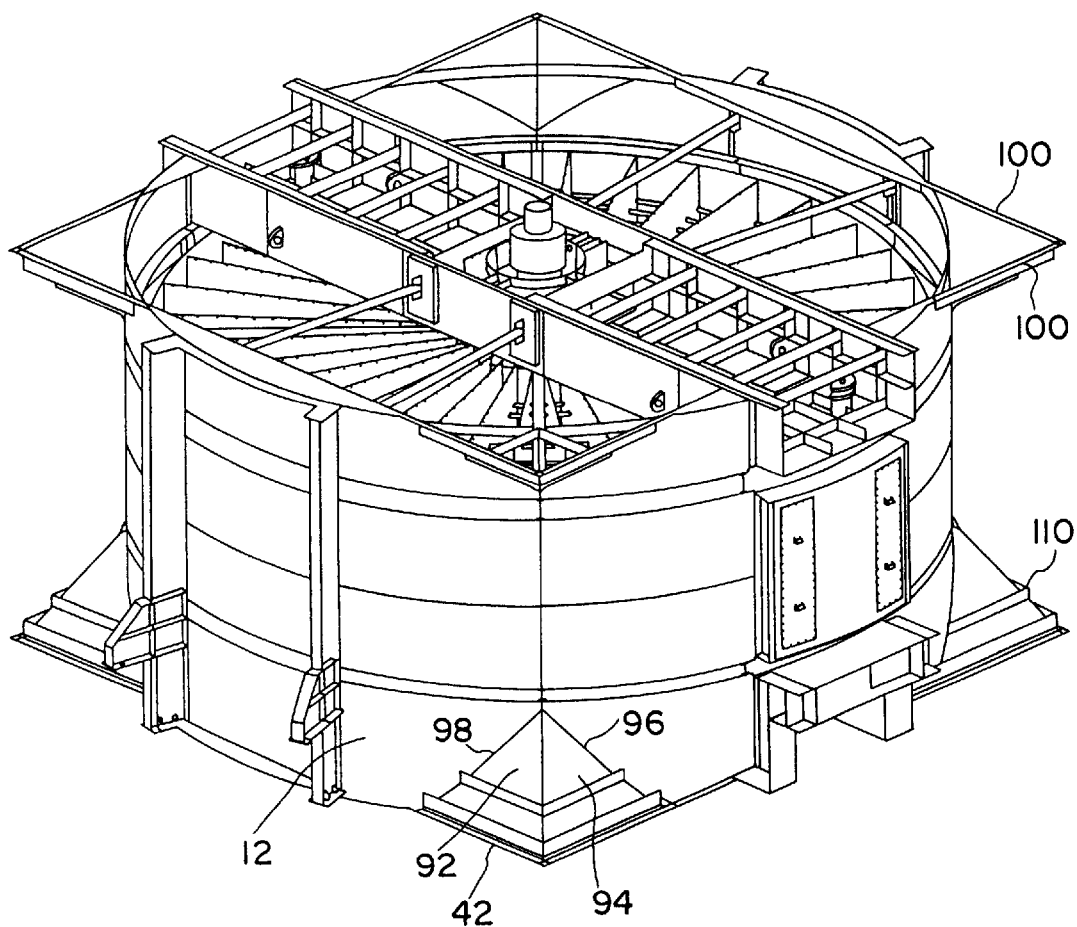
FIG. 7 is a perspective view of the air preheater illustrating the relationship between the transition corner and the housing.

With reference to FIGS. 5 and 6, an single seam corner 42 in accordance with the invention comprises first and second double angle flow deflectors 92, 94 which form the corner 64, eliminating the need for outer sidewall segments and end wall segments. Each double angle flow deflector 92, 94 has a substantially triangular shape when viewed from in front, having first and second side edges 96, 98 which extend from an outer terminal edge 100 to an inner point 102. When viewed from the side it is apparent that each flow deflector 92, 94 has an arcuate shape, with the mid portion 104 of the flow deflector 92, 94 being vertically bowed toward the duct 44, 46, 48, 50.

The single seam corner 42 is formed by mounting the first side edge 96 of the first double angle flow deflector 92 to the second side edge 98 of the second double angle flow deflector 94 along a first weld seam 106. When so joined, the second side edge 98 of the first double angle flow deflector 92 and the first side edge 96 of the second double angle flow deflector 94 each form an arcuate shaped trailing edge. The outer terminal edges 100 of the first and second flow deflectors 92, 94 are mounted directly to the duct mounting flange 60 by a second weld seam 108 to form a complete corner. It should be appreciated that such construction eliminates two of the weld seams 82, 84 required to form the conventional corner.

Since the double angle flow deflectors 92, 94 are still composed of sheet metal, stiffening elements 110 may still be required to provide the proper mechanical strength to the corner 42. However, the arcuate shape of each double angle flow deflector 92, 94 and the first weld seam 106 connection between the first and second double angle flow deflectors 92, 94 provides a corner 42 which is inherently stiffer than conventional corners. Therefore, the number of stiffening elements 110 which are required will be reduced from that required by a conventional corner.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A transition element for providing an interface between a duct having a substantially rectangular cross section and a device having a substantially circular cross section, the transition element comprising an inner sidewall, an outer sidewall, and first and second end walls, the outer sidewall and the first and second end walls defining first and second transition corners, each of the transition corners including first and second flow deflectors, each of the flow deflectors having an outer terminal edge and first and second side edges extending laterally from the terminal edge to an inner point, the first side edge of the first flow deflector being mounted to the second side edge of the second flow deflector, the outer terminal edges of the first and second flow deflectors being adapted for mounting to the duct, the second side edge of the first flow deflector and the first side edge of the second flow deflector being adapted for mounting to the device.

2. The transition element of claim 1 wherein the first side edge of the first flow deflector is mounted to the second side edge of the second flow deflector by a first weld seam.

3. The transition element of claim 1 wherein each flow deflector has a mid portion disposed intermediate the outer terminal edge and the inner point and an arcuate shape, the mid portion of the flow deflector being bowed toward the duct.

4. The transition element of claim 3 wherein the second side edge of the first flow deflector and the first side edge of the second flow deflector each form an arcuate shaped trailing edge.

5. The transition element of claim 1 further comprising a duct mounting flange adapted for mounting to the duct, the outer terminal edges of the first and second flow deflectors being mounted directly to the duct mounting flange.

6. The transition element of claim 5 wherein the outer terminal edges of the first and second flow deflectors are mounted to the duct mounting flange by a second weld seam.

7. The transition element of claim 1 further comprising one or more stiffening elements, the first and second flow deflectors each further having a duct face adapted for facing the duct and a device face adapted for facing the device, the stiffening elements being mounted to the device face of the first or second flow deflector.

8. A preheater system for preheating combustion air for a boiler with flue gas exiting the boiler, the preheater system comprising:

an air preheater having a substantially circular cross section and a rotor bearing a heat transfer mass which is rotatable through a flue gas sector for absorbing heat from the flue gas and an air sector for releasing heat to the combustion air;

a plurality of ducts, each of the ducts having a substantially rectangular cross section, the ducts including a cool air duct adapted for carrying cool combustion air to the air preheater, a hot air duct adapted for carrying heated combustion air from the air preheater to the boiler, a hot flue gas duct adapted for carrying hot flue gas from the boiler to the air preheater, and a cold flue gas duct adapted for carrying cooled flue gas from the air preheater; and a transition system including a first transition element disposed intermediate the cool air duct and the air sector of the air preheater, a second transition element disposed intermediate the hot air duct and the air sector of the air preheater, a third transition element disposed intermediate the hot flue gas duct and the flue gas sector of the air preheater, and a fourth transition element disposed intermediate the cold flue gas duct and the flue gas sector of the air preheater, each of the transition elements including an inner sidewall, an outer sidewall, and first and second end walls, the outer sidewall and the first and second end walls defining first and second transition corners, each of the transition corners comprising first and second flow deflectors, each of the flow deflectors having an outer terminal edge and first and second side edges extending laterally from the terminal edge to an inner point, the first side edge of the first flow deflector being mounted to the second side edge of the second flow deflector, the second side edge of the first flow deflector and the first side edge of the second flow deflector being mounted to the air preheater.

9. The preheater system of claim 8 wherein each flow deflector has a mid portion disposed intermediate the outer terminal edge and the inner point and an arcuate shape, the mid portion of the flow deflector being bowed toward the duct.

10. The preheater system of claim 9 wherein the second side edge of the first flow deflector and the first side edge of the second flow deflector each form an arcuate shaped trailing edge.

11. The preheater system of claim 9 further comprising a duct mounting flange, the outer terminal edges of the first and second flow deflectors being mounted directly to the duct mounting flange.

12. The preheater system of claim 11 further comprising at one or more stiffening elements, the first and second flow deflectors each further having a duct face adapted for facing the duct and a device face adapted for facing the device, the stiffening elements being mounted to the device face of the first or second flow deflector.

13. A transition element for providing an interface between a duct having a substantially rectangular cross section and an air preheater having a substantially circular cross section, the transition element comprising an inner sidewall, an outer sidewall, first and second end walls, and a duct mounting flange, the outer sidewall and the first and second end walls defining first and second transition corners, each of the transition corners including first and second flow deflectors, each of the flow deflectors having an outer terminal edge, first and second side edges extending laterally from the terminal edge to an inner point, a mid portion disposed intermediate the outer terminal edge and the inner point, and an arcuate shape, the mid portion of the flow deflector being bowed toward the duct, the first side edge of the first flow deflector being mounted by a first weld seam to the second side edge of the second flow deflector, the outer terminal edges of the first and second flow deflectors being mounted to the duct mounting flange by a second weld seam, the duct mounting flange being adapted for mounting to the duct, the second side edge of the first flow deflector and the first side edge of the second flow deflector being adapted for mounting to the air preheater.

* * * * *